Figure 1:
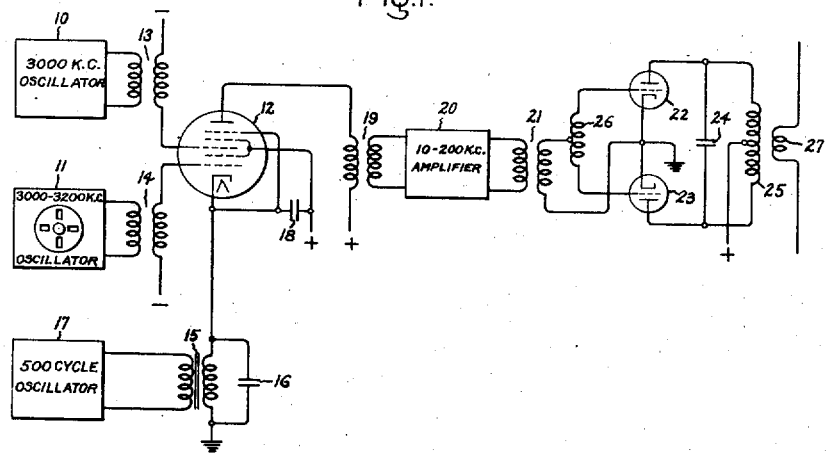

July 8, 1941.    E. F. W. ALEXANDERSON    2,248,599
RADIO DISTANCE METER
Filed Sept. 7, 1939

Inventor:
Ernst F. W. Alexanderson,
by Harry E. Dunham
His Attorney.

Patented July 8, 1941

2,248,599

UNITED STATES PATENT OFFICE 2,248,599

RADIO DISTANCE METER

Ernst F. W. Alexanderson, Schenectady, N. Y., assignor to General Electric Company, a corporation of New York Application September 7, 1939, Serial No. 293,741

16 Claims. (Cl. 250—1)

This invention relates to distance measuring apparatus and more particularly to apparatus for measuring distances by means of radio waves.

The necessity for operating airplanes under foggy conditions and at night has made it exceedingly desirable to devise methods for measuring distances, such as the altitude of the aircraft, which are more reliable than optical or sonic methods. Many attempts, of which some have been partially successful, have been made to devise means using radio waves for measuring distances. Early devices created a standing wave by reflection from the remote object to which the distance was to be measured, and by counting the nodes and loops on the standing wave between the object and the observer the distance was determinable if the wave length was known. Later devices have superimposed such standing waves upon other waves of much higher frequency. Another method, disclosed and claimed in the Patent No. 2,011,392 issued to J. O. Bentley on August 13, 1935, is to vary the wave length of the standing wave recurrently and linearly between limits and to count the number of nodes and loops which pass the observer per second or the number which pass the observer during the period while the wave length is changed once linearly between the limits.

It has been found that radio waves may be used to measure the distance between two points with very simple apparatus by the use of a new and fundamentally different method. In practicing the present invention waves of very high frequency are propagated toward the object whose distance from the observer is to be measured and standing waves are thus created. The frequency of the propagated waves is varied cyclically with such extreme rapidity that the waves which have been transmitted and reflected back to the transmitter arrive at the transmitter at the instant when it is again transmitting waves having a recognizable frequency characteristic with respect to the reflected waves. The frequency with which the frequency of the radiated waves is varied is then a measure of the desired distance.

The features of my invention which I believe to be novel are set forth with particularity in the appended claims. My invention itself, however, both as to its organization and method of operation, together with further objects and advantages thereof may best be understood by reference to the following description taken in connection with the accompanying drawing in which Fig. 1 illustrates a transmitter designed to transmit high frequency waves in accordance with my invention and Figure 2 is a receiver adapted to receive such high frequency waves and, in conjunction with the transmitter, indicate the distance to a reflecting object.

Figure 2:
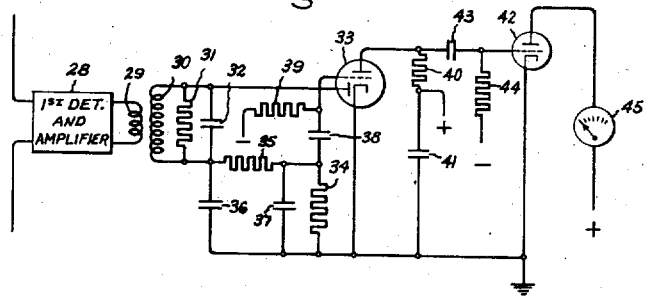

Referring to Figure 1, there is illustrated a transmitter of very high frequency waves which is adapted to vary the frequency of those waves at an adjustable high frequency. The transmitter comprises a heterodyne generator which includes an oscillator 10 for generating waves of a fixed frequency, an adjustable oscillator 11 for generating waves of an adjustable frequency and a pentagrid mixer tube 12 for converting these two frequencies into waves having their difference frequency. The oscillator 10 is connected through a transformer 13 to the third grid from the cathode of the tube 12 and the oscillator 11 is connected through a similar transformer 14 to the first grid of the tube 12. Suitable sources of bias potential are connected through the secondaries of these transformers to the respective first and third grids of tube 12. The cathode of the tube 12 is grounded through a transformer 15 which is shunted by a high frequency by-passing condenser 16. An audio frequency oscillator 17 is connected to the transformer 15 for the purpose of modulating the radiated wave with a recognizable note. This modulation is a convenient means for making easier the detection of a recognizable frequency relation between the radiated wave and the reflected wave. The screen grids of the tube 12 are connected to a suitable source of positive potential and are also connected through a high frequency by-passing condenser 18 to the cathode. The anode of the tube 12 is supplied with a suitable source of operating potential through the primary of a transformer 19.

The adjustable frequency produced by the heterodyne generator and modulated by the audible note is transmitted by the transformer 19 through a suitable amplifier 20 to a transformer 21. This transformer 21 has its secondary winding connected between the grids and cathodes of discharge devices 22 and 23 of an oscillator whose frequency varies in accordance with the voltage in transformer 21.

This oscillator, whose frequency varies rapidly in response to changes in its grid bias voltage, is shown as including a pair of triode discharge tubes 22 and 23 which are connected in push-pull relation. The cathodes of the tubes 22 and 23 are grounded. The anodes of the tubes are connected to the opposite ends of a tuned circuit including a condenser 24 and an inductance 25. A suitable source of anode operating potential is connected to the center of the inductance. The grids of the tubes 22 and 23 are connected to the opposite ends of a low resistance inductance 26. The center of the inductance 26 is connected through the secondary of the transformer 21 to ground. The secondary of the transformer 21 has a very low resistance. It has been found that such an oscillator in which the resistance of the grid circuit is kept very low changes in frequency greatly in response to changes in grid bias voltage. Positive feedback to produce oscillations in the oscillator which I have shown is obtained through interelectrode capacity.

The inductance 25 is coupled to a coil 27 which comprises a portion of a dipole antenna for radiating the varying frequency produced by the high frequency oscillator.

In Fig. 2 there is illustrated a receiver which is designed to indicate the intensity of beat frequency components between the transmitted wave and the wave reflected from the surface whose distance is being measured. When the frequency of the reflected wave returning to the receiver corresponds closely at all times to the frequency of the wave passing directly from the transmitter to the receiver, there are a minimum of beat frequency or heterodyne components. Conversely, when the frequency of the oscillator of Figure 1 varies at such speed that the reflected wave reaching the receiver attains its lowest frequency at the instant when the wave coming directly from the transmitter attains its highest frequency, there are a maximum of beat frequency components. Either of these conditions may be used to indicate distance.

The receiver comprises a suitable dipole antenna for intercepting radio waves and a first detector and amplifier 28 of ordinary construction connected thereto. The receiver is capable of responding to any signal emitted by the transmitter. The amplifier has been operated at an intermediate frequency of 2 megacycles. The output of the detector and amplifier 28 is coupled through a coil 29 to a damped tuned circuit comprising a coil 30, a resistance 31, and a condenser 32. A duplex-diode-triode tube 33 has its diode section connected in series with a load resistance 34 and a pi-section filter comprising a resistance 35 shunted at the ends by condensers 36 and 37. This diode, load resistor, and filter constitute a second detector. The voltage which appears across the load resistor 34 contains all the modulation components of the received waves, which are the beat frequency components mentioned above, as well as the audio frequency note used to facilitate detection of the received waves. The grid of the triode section of tube 33 is connected through a condenser 38 to one end of the load resistance 34. This grid is also connected through a resistance 39 to a suitable source of bias potential. The anode of the triode section is connected through a load resistance 40 to a suitable source of operating potential across which is connected a condenser 41, the latter being connected to the cathode of the discharge device 33. The condenser 38 has a sufficiently high reactance at 500 cycles to prevent substantial passage of the 500 cycle modulation component. The triode section of the tube 33 operates on a non-linear portion of its characteristic so that the beat frequencies mentioned above are demodulated, and the voltage appearing across resistance 40 has a frequency of 500 cycles and corresponds in amount to the amount of beat frequency components received.

A vacuum tube voltmeter is used to measure the amount of this 500 cycle voltage on resistance 40 and comprises a tube 42 whose cathode is connected through condenser 41 to one end of resistance 40. The grid of tube 42 is connected through a condenser 43 to the other end of resistance 40, and is also connected through a resistance 44 to a source of bias potential sufficiently negative that the tube 42 operates on a non-linear portion of its characteristic. The anode of tube 42 is connected through a suitable direct current meter 45 to a source of operating potential.

To measure distance the transmitter and the receiver are shielded sufficiently well from each other so that the reflected wave may be detected by the receiver in the presence of a wave received directly from the transmitter. Assuming an object at some unknown distance, which it is desired to measure, the frequency of the oscillator 11 is adjusted over its range until the meter 45 reaches either a maximum or minimum. For example, assume that it be found that meter 45 reaches a minimum when the heterodyne generator is adjusted to a frequency of 100 kilocycles. Since the frequency of the transmitted wave varies at a rate of 100 kilocycles per second, the distance from the reflecting object is about 4900 feet. The distance may be determined for any setting of the oscillator 11 by dividing the distance travelled by the radiated waves in air per second by twice the number of cycles per second through which the frequency of the radiated wave passes. It is, of course, obvious that the control dial of the oscillator 11 may conveniently be calibrated in distance units.

Certain values have been used for the various components of the apparatus described. For example, in one apparatus embodying my invention the oscillator 10 operated at 3000 kilocycles and the oscillator 11 at an adjustable frequency between 3000 and 3200 kilocycles. The amplifier 20 was designed to pass waves between 10 and 200 kilocycles modulated by 500 cycles. The oscillator 22, 23 including condenser 24 and inductance 25 operated near 90 megacycles. It will, of course, be understood that these values are mentioned only as one set of values which may be used and that these values may be varied over a wide range.

If it be assumed that the heterodyne generator be adjusted to produce 100 kilocycles when the meter 45 reads a maximum, the distance may be determined in a similar manner. The distance under such conditions is actually one-half that which was found above, or in other words, about 2450 feet. When using the apparatus in either of the two ways, in order to obviate the possibility that the distance is actually some multiple of that which is determined, it is well to begin adjustment of the heterodyne generator at zero, or a minimum, frequency and progress toward maximum frequency until the first maximum, or minimum, of meter 45 is located, as may be convenient. With the apparatus described, wherein oscillator 11 has a high frequency of 3200 kilocycles, it is impossible to find two settings for oscillator 11 where the meter 45 reads a minimum unless the distance to be measured is greater than 4900 feet. Likewise, it is not possible to find two settings for the oscillator 11 where the meter 45 reads a maximum unless the distance to be measured is greater than about 3700 feet.

As mentioned above, it is unnecessary to use an audio frequency modulation on the transmitted wave, although it is believed to be desirable. If no modulation is desired, transformer 15, condenser 16, and oscillator 17 may be omitted from the circuit of Fig. 1, so that the cathode of tube 12 is connected directly to ground. Then in the circuit illustrated in Fig. 2 the source of bias voltage connected to the resistor 39 may be adjusted so that the triode section of tube 31 acts as an amplifier to amplify the beat frequencies which are produced across load resistor 34. These beat frequencies are converted by the bias detector tube 42 to direct current and their amount is indicated by meter 45.

While I have shown a particular embodiment of my invention, it will, of course, be understood that I do not wish to be limited thereto, since different modifications may be made both in the circuit arrangement and instrumentalities employed, and I aim by the appended claims to cover any such modifications as fall within the true spirit and scope of my invention.

What I claim as new and desire to secure by Letters Patent of the United States, is:

1. The method of measuring distance to a reflecting surface which comprises transmitting a wave toward the surface, varying the frequency of the transmitted wave at an adjustable speed, and adjusting the speed of variation of said frequency to produce a predetermined frequency relation between said transmitted wave and the wave reflected from said surface.

2. The method of measuring the distance to a reflecting surface, which comprises transmitting a wave toward the surface, beating the transmitted wave with the wave reflected from said surface, varying the frequency of the transmitted wave cyclically at an adjustable frequency, and adjusting the frequency of the cyclic frequency variation of said wave to produce a maximum amount of beat frequency components between said transmitted wave and said reflected wave.

3. The method of measuring the distance to a reflecting surface, which comprises transmitting a wave toward the surface, beating the transmitted wave with the wave reflected from said surface, varying the frequency of the transmitted wave cyclically at an adjustable frequency, and adjusting the frequency of the cyclic frequency variation of said wave to produce a minimum amount of beat frequency components between said transmitted wave and said reflected wave.

4. The method of measuring the distance to a reflecting object which comprises transmitting a high frequency wave toward the object for reflection therefrom, varying the frequency of the wave cyclically at an adjustable frequency, and adjusting the frequency of such cyclic frequency variation to produce a predetermined frequency relation between the transmitted wave and the reflected wave.

5. The method of measuring the distance to a reflecting object which comprises transmitting a high frequency wave toward the object, producing a standing wave formed by the transmitted wave and the wave reflected from said object, varying the frequency of the transmitted wave sinusoidally, indicating the amplitude of the standing wave, and adjusting the frequency of such sinusoidal variation of the frequency of said transmitted wave so that a maximum of the standing wave is indicated.

6. The method of measuring the distance to a reflecting object which comprises transmitting a high frequency wave toward the object, producing a standing wave formed by the transmitted wave and the wave reflected from said object, varying the frequency of the transmitted wave sinusoidally, indicating the amplitude of the standing wave, and adjusting the frequency of such sinusoidal variation of the frequency of said transmitted wave so that a minimum of the standing wave is indicated.

7. The method of measuring the distance to a reflecting surface, which comprises transmitting a wave toward the surface, beating the transmitted wave with the wave reflected from said surface, varying the frequency of the transmitted wave cyclically, adjusting the frequency of such cyclic variation of frequency of said transmitted wave, and determining the distance by the frequency of said cyclic variation at a predetermined intensity of the beat frequency components produced.

8. The method of measuring the distance to a reflecting surface, which comprises transmitting a high frequency wave toward the surface to produce a standing wave between the transmitted wave and the wave reflected from said surface, varying the frequency of the transmitted wave cyclically, adjusting the frequency of such cyclic variation of frequency of said transmitted wave, and determining the distance by the frequency of such cyclic variation at a predetermined intensity of said standing wave.

9. Apparatus for measuring the distance to a reflecting surface which comprises means for transmitting a wave toward said surface for reflection therefrom, means to vary the frequency of said wave at an adjustable speed, and means to adjust the speed of operation of said frequency varying means to produce a predetermined frequency relation between the transmitted wave and the reflected wave.

10. Apparatus for measuring the distance to a reflecting surface which comprises means for transmitting a wave toward said surface, means for beating said transmitted wave with the wave reflected from said surface, means to vary the frequency of said wave at an adjustable speed, and means to adjust the speed of operation of said frequency varying means to produce a maximum amount of beat frequency components.

11. Apparatus for measuring the distance to a reflecting surface which comprises means for transmitting a wave toward said surface, means for beating said transmitted wave with the wave reflected from said surface, means to vary the frequency of said wave at an adjustable speed, and means to adjust the speed of operation of said frequency varying means to produce a minimum amount of beat frequency components.

12. Apparatus for measuring the distance to a reflecting surface which comprises means for transmitting a wave toward said surface for reflection therefrom, means to vary the frequency of said wave cyclically at an adjustable speed, and means to adjust the frequency of cyclic operation of said frequency varying means to produce a predetermined frequency relation between the transmitted wave and the reflected wave.

13. Apparatus for measuring the distance to a reflecting surface which comprises means for transmitting an electromagnetic wave toward said surface for reflection therefrom, means to vary the frequency of said wave sinusoidally, means for beating said transmitted wave with the wave reflected from said surface, means to measure the amount of beat frequency components, and means for operating said frequency varying means to adjust the frequency of variation of the transmitted wave to produce a critical amount of beat frequency components recognizable by said measuring means.

14. Apparatus for measuring the distance to a reflecting surface which comprises means for transmitting a high frequency wave modulated with a low frequency wave toward said surface for reflection therefrom, means to vary the frequency of said high frequency wave cyclically, means to beat said transmitted wave with the wave reflected from said surface, means to demodulate the beat frequency components between said waves to obtain the low frequency wave modulated thereon, means to measure the amount of said low frequency wave obtained from said beat frequency components, and means for adjusting the speed of operation of said frequency varying means to produce a critical amount of said low frequency wave at said measuring means.

15. Apparatus for measuring the distance to a reflecting surface, which comprises means for transmitting a wave toward said surface, means for beating the transmitted wave with the wave reflected from said surface, means for varying the frequency of said transmitted wave cyclically, means to adjust the frequency of cyclic operation of said frequency varying means, and means for indicating the distance by the adjustment of said adjusting means at a predetermined intensity of the beat frequency components produced.

16. Apparatus for measuring the distance to a reflecting surface, which comprises means for transmitting a wave toward the surface, said transmitted wave producing a standing wave with the wave reflected from said surface, means for varying the frequency of the transmitted wave cyclically, means to adjust the frequency of cyclic operation of said frequency varying means, and means for indicating the distance by the adjustment of said adjusting means at a predetermined intensity of said standing wave.

ERNST F. W. ALEXANDERSON.